United States Patent [19]

Barma

[11] Patent Number: 4,703,533
[45] Date of Patent: Nov. 3, 1987

[54] RUBBER FOOTWEAR VULCANIZATE ASSEMBLY AND ITS MANUFACTURE

[75] Inventor: Tarachand S. Barma, La Crosse, Wis.

[73] Assignee: La Crosse Rubber Mills, Inc., La Crosse, Wis.

[21] Appl. No.: 784,309

[22] Filed: Oct. 4, 1985

[51] Int. Cl.⁴ .......................... A43B 1/10; A43B 1/12
[52] U.S. Cl. .......................... 12/142 E; 12/142 EV; 36/4; 36/14
[58] Field of Search .......... 12/142 E, 142 EV, 142 T; 36/4, 7.3, 14, 17 R, 78, 15; 264/244

[56] References Cited

U.S. PATENT DOCUMENTS

| | | | |
|---|---|---|---|
| 822,692 | 6/1906 | Schaffer | 36/4 |
| 992,515 | 5/1911 | Mulconroy | 36/4 |
| 2,317,879 | 4/1943 | Bingham, Jr. | 12/142 E |
| 2,317,880 | 4/1943 | Bingham, Jr. | 36/4 |
| 2,546,553 | 3/1951 | Majtner | 36/78 |
| 2,742,389 | 4/1956 | Riley et al. | 36/4 |
| 3,271,887 | 9/1966 | Werman | 36/14 |
| 3,742,623 | 7/1973 | Groothaert | 36/4 |

FOREIGN PATENT DOCUMENTS

| | | | |
|---|---|---|---|
| 375792 | 10/1939 | Italy | 12/142 E |
| 537561 | 6/1941 | United Kingdom | 12/142 E |

Primary Examiner—Ronald Feldbaum
Assistant Examiner—Steven N. Meyers
Attorney, Agent, or Firm—M. Paul Hendrickson

[57] ABSTRACT

The present invention provides a rubber footwear vulcanizate to which there may be separately affixed an outsole. The vulcanizate may be suitably manufactured from an assembly of an uncured rubber upper, insole, welt and a vulcanized midsole base article. The inner and outer surfaces of the midsole base article may be suitably roughened and the surface interfacing the uncured assemblage precoated with an uncured rubber. The assembled uncured rubber footwear components may be vulcanized into a vulcanizate footwear product of a unitary construction. The outer surface midsole surface permits a wide variety of compositionally differing outer soles to be separately secured thereto.

8 Claims, 12 Drawing Figures

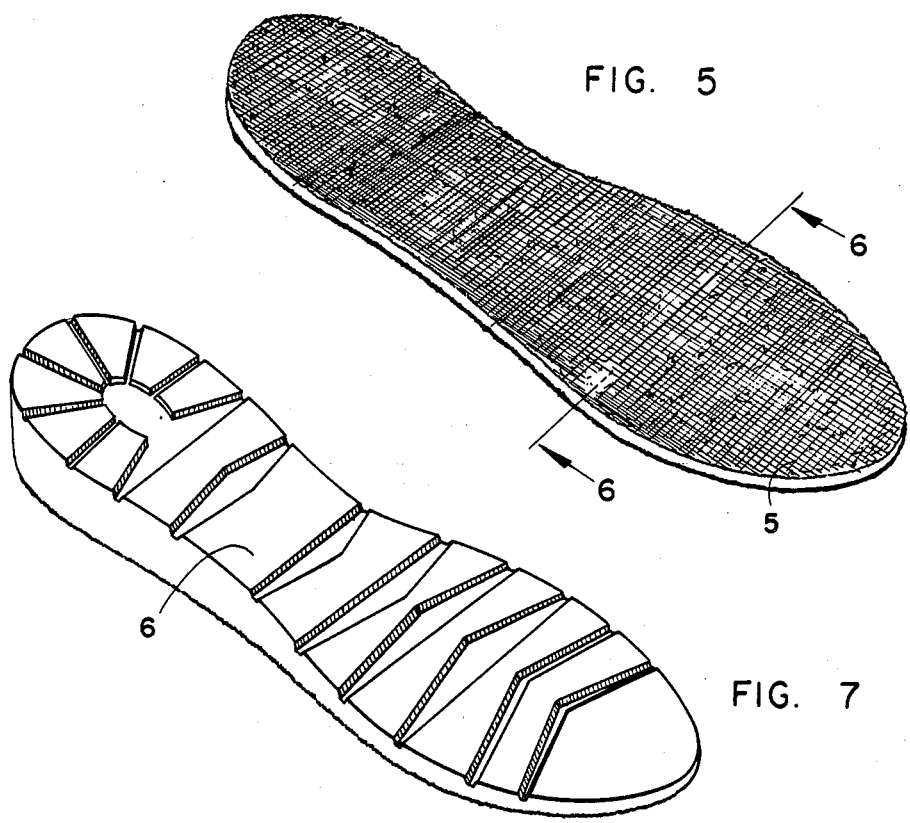
FIG. 5
FIG. 6
FIG. 7
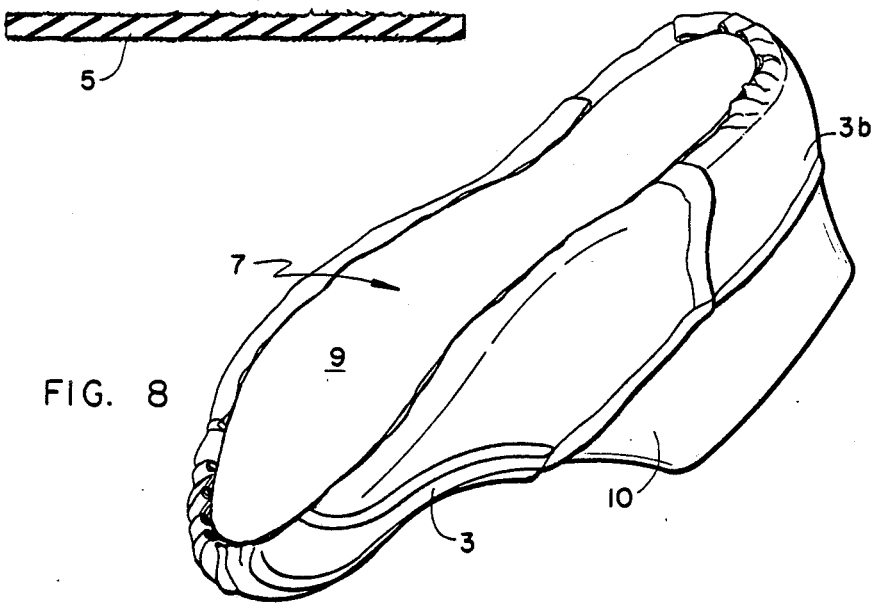
FIG. 8

RUBBER FOOTWEAR VULCANIZATE ASSEMBLY AND ITS MANUFACTURE

SUMMARY OF THE INVENTION

This invention generally relates to rubber footwear products and the manufacture thereof, and more particularly it relates to the manufacture of rubber footwear products comprises of a vulcanizate assembly of uncured rubber upper portion, insole, and midsole; and the vulcanizate assembly in combination with an outsole separately affixed to the midsole of the vulcanizate assembly and products thereof.

BACKGROUND OF THE INVENTION

In the conventional manufacture of a rubber footwear product, uncured rubber or rubber coated fabrics are typically milled or extruded into the appropriate thicknesses from which the desired sized component parts for the footwear product are cut. The assembly of uncured components are normally formed upon a forming device such as a metal last. The metal last bears the internal shape and size of the desired footwear product. The last is normally of a heat conductive metal construction such as hollowed, shoe or boot-shaped aluminium form. Pursuant to such manufacture, it is conventional to assemble an uncured rubber upper portion, an uncured conventional rubber insole, an uncured foxing band (e.g. a flat uncured strip), an uncured rubber binder (e.g. uncured sheeting stock or filler) and a precured rubber sole coated upon the forming last. This completed footwear assembly is then vulcanized to provide the desired rubber footwear vulcanizate product.

In a typical assemblage, an uncured shoe or boot upper is positioned so as to adhesively overlap the insole upon the last. An uncured foxing band or flat band (e.g. 1-2 inches in width) is then placed around the outer periphery or rim of the rubber upper followed by the emplacement of an uncured binder or filler onto the insole. The binder or filler will not normally extend beyond the exposed surface of the insole. An uncured rubber outsole is then wrapped over the projecting edge of the insole onto the uncured rubber upper above the feather line. The uncured rubber assembly (which appearance is of a crude footwear) is then vulcanized, typically for about 1 to 2 hours at temperatures ranging from about 250°-350° F. upon the last to provide the vulcanizate product. The component parts are thereby chemically and physically melded into a complete vulcanizate footwear product of unitary construction.

Uncured or unvulcanized rubber (natural or synthetic) footwear components normally posses sufficient tack for assemblage upon the forming last. An uncured rubber formulation generally includes ethylenically unsaturated polymeric substances in combination with conventional vulcanization or curative additives. Included amongst such conventional additives are cross-linking reagents such as sulfur, accelerators, tackifiers antioxidants, activators, etc., which permit the formulation to be cured into a vulcanizate product. The additives and polymeric rubber substances are usually admixed in a Branbury mixer and then formed into the desired thickness or shape of the footwear component parts. This is usually accomplished by milling, extruding, calendering techniques, etc. without curing the rubber formulation.

Vulcanization of the uncured assemblage alters the chemical and physical attributes of the rubber composition via crosslinkage of the ethylenically unsaturated polymeric linkages with the crosslinking reagent. Cross linkage occurs not only within each of the individual assembled component parts but also between those ethylencially unsaturated polymeric molecules positioned at the interface of the adhesively overlapped component parts. This melds the component parts into a vulcanizate product of a unitary construction.

Heretofore, the conventional manufacture of such rubber footwear products necessitated vulcanization of the entire assemblage. Such a manufacture has placed severe constraints upon the rubber footwear manufacturing industry. Thermoplastic and other natural or synthetic polymeric substances thermally sensitive or degradable upon vulcanization were not acceptable for use in such a manufacture. Outsoles for such footwear products were essentially limited to those of a rubber vulcanizate construction. Such constraints made it difficult for the rubber footwear industry to effectively compete against other footwear products, the later of which manufacture permits more fashionable designs (e.g. high heeled shoes, western boots, contrasting sole colors, etc.) at a low cost. Footwear of a lightweight construction, replaceable or repairable soles, speciality soles adapted for specific uses (e.g. spiked, cleated, ridged soles such as for golf, football, hiking, baseball, etc.) or other speciality wear features were not feasible under the existing technology of such rubber footwear manufacture.

It would desirable for the rubber footwear industry to be able to incorporate many of the desirable attributes of such other footwear products into a footwear vulcanizate while preserving many of its other desirable attributes such as resistance towards air, gas, sunlight, hydrocarbon, moisture penetration, fats and oils, acid and other chemicals, along with its excellent durability of wear, strength, elasticity, electrical and heat insulation, structural integrity properties, etc. A uniquely different method of manufacturing rubber footwear products would be desirable especially if it were able to provide footwear products uniquely different in construction, utility and design. Rubber vulcanizate footwear products suitably adapted to separately receive an outsole would afford significant labor, equipment, production time and material savings. Notwithstanding a long felt need for uniquely different rubber vulcanizate footwear products and manufacture thereof, the manufacture of rubber footwear vulcanizates has remained essentially unchanged since the beginning of this century.

The athletic sports footwear product (e.g. tennis shoes, etc.) manufacture, generally differs from those products of the rubber vulcanizate manufacture in that it frequently includes a polyurethane outsole construction. Such outsoles are normally incorporated into the athletic footwear by injection molding techniques. U.S. Pat. No. 4,245,406, by Landay, discloses a sport shoe having an outsole comprised of an injection molded polyurethane midsole construction to which there is attached a rubber outer sole. Similarly, U.S. Pat. No. 4,455,765, by Sjosward, discloses an outsole with a polyurethane midsole sport shoe product with a rubber outer sole. A patent issued to Giese U.S. Pat. No. 4,366,634) discloses an injection molded sport shoe, such as a tennis shoe, having a fabric upper portion secured to a sidewall with an outsole constructed of two different materials (preferably rubber and a polyurethane midsole) to which there is bonded a rubber outer sole. Another variation involving polyurethane shoe construction is disclosed by U.S. Pat. No. 4,228,600 by Kruge. The Kruge shoe bottom is disclosed as comprising a flexible, closed-cell, crosslinked polyolefin foam having at least one surface of exposed open cells and an elastomeric polyurethane film which encompasses the foam.

A method for manufacturing a ski boot constructed of an upper part and a prefabricated sole is disclosed in U.S. Pat. No. 3,273,263 by Kilma. The prefabricated sole of Kilma includes a metal plate adapted to receive notched nails or screws embedded within the sole. The sole is secured to the ski boot by means of glue and nails or screws. In another U.S. Pat. by Denu (No. 4,130,947) there is disclosed a method of making a sole wherein a layered substance resistant to abrasion is vulcanized onto a dampening layer of a synthetic or natural rubber.

U.S. Pat. No. 2,983,643 by Seiberling discloses a heel obstensibly suitable for adaptation to footwear constructed of leather uppers. Seiberling mentions, in column 1, lines 25-32, the unique difficulties typically encountered when it is desired to adhesively bond a cured rubber heel to another surface. According to Seiberling, it is customary to abrade the skin surface of the cured rubber to roughen it, otherwise the cured skin becomes so slick that it does not form a good bond with the adhesive. The roughened surfaces of the cured rubbers may then be adhered to another surface by an adhesive. Seiberling proposes to avoid the need for roughening by incorporating cellulosic fibrous materials into that portion of the heel surface to the glued (e.g. animal glue) onto the shoe. This is reportedly accomplished by placing an uncured or raw rubber biscuit with an overlying fibrous mat into a mold, which is then vulcanized into a heel vulcanizate having embedded cellulosic fibrous projections upon the glueing side.

A European patent specification by Phillips (Publication No. 0 075 861) further illustrates the attendant problem in repairing leather footwear with thermosetting butadiene-styrene half soles. Phillips proposes to overcome this problem by imparting a pebbled surface texture onto the half sole. The pebbled surface reportedly enhances the adhesive properties of the sole and facilitates the application of a hot melt adhesive thereto.

BRIEF DESCRIPTION OF THE DRAWINGS

FIG. 5 depicts a perspective top view of a midsole used in the manufacture of the FIG. 1 product.

FIG. 6 shows a cross-sectional view taken along line 6—6 of the FIG. 5 midsole.

FIG. 7 represents a perspective bottom view of an outsole.

FIG. 8 illustrates a perspective bottom view of the insole overlapped with an uncured rubber upper upon a forming last.

DETAILED DESCRIPTION OF THE INVENTION

Figure 1:
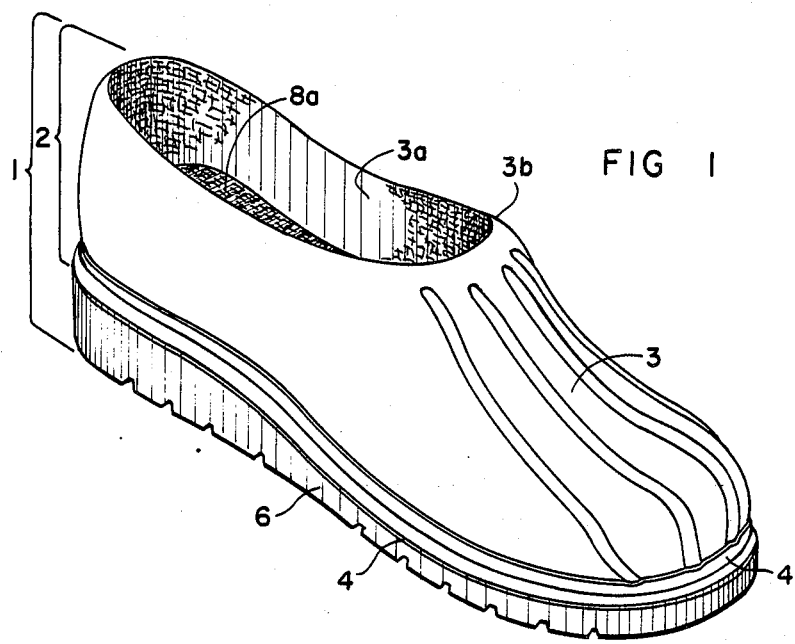
FIG. 1 is a perspective side view of a rubber footwear product manufactured in accordance with the present invention.

The present invention affords a rubber footwear product (generally designated as 1 in FIG. 1) comprises of a vulcanizate assembly (generally designated as 2) which assembly includes a rubber upper portion 3, a rubber insole (occluded from view) and a rubber midsole article 5 of a unitary vulcanizate construction to which there has been separately secured an outsole 6. The incorporation of a rubber welt 4 into the vulcanizate construction leads to further improvements in the footwear product. The inclusion of an uncured rubber welt 4 into the overall uncured assemblage and its intervulcanization with other uncured rubber components as illustrated in the accompanying drawings significantly enhances the structural integrity, strength, water resistance and wear properties of the vulcanizate product.

In another embodiment of the prsent invention there is provided a method for the manufacture of a rubber footwear product comprised of the vulcanizate assembly 2 of a unitary construction, which assembly includes a rubber upper portion 3, an insole (as further illustrated in FIG. 2), a rubber welt 4, and a midsole 5, and an outsole 6 seperately affixed to the midsole 5 of said vulcanizate assembly 2.

Figure 4:
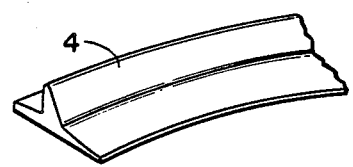
FIG. 4 illustrates a perspective side view of a fragmentary portion of an uncured rubber welt.
Figure 2:
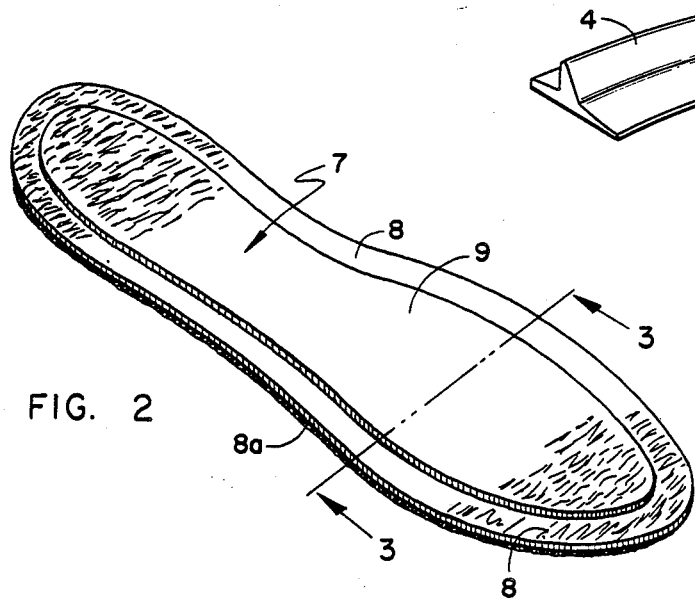
FIG. 2 is a perspective top view of an insole assembly.
Figure 3:
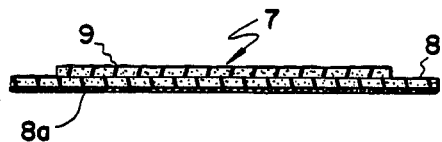
FIG. 3 is a cross-sectional view taken along line 3—3 of the FIG. 2 insole assembly.
Figure 12:
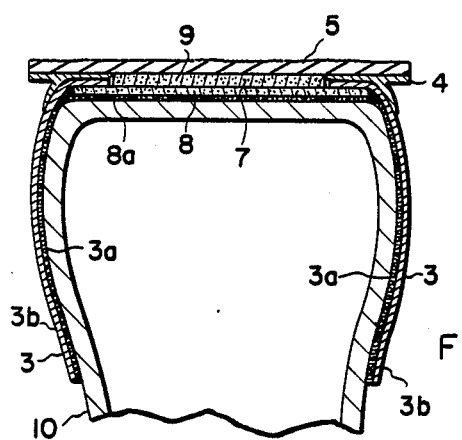
FIG. 12 is a cross-sectional view taken along line 12—12 showing the completed uncured assembly of the footwear product.

The component parts and the method of manufacture of the footwear product may be more fully appreciated by reference to FIGS. 2-12. Figure 2 illustrates an insole 7 suitable for use in the manufacture of the footwear products herein. This particular insole 7 includes an insole base 8 and an insole filler 9 which has been added for insulation and comfort purposes. FIG. 3 depicts a cross-sectional view taken along lines 3—3 of the insole 7 of FIG. 2. FIG. 4 depicts a fragmentary portion of an uncured rubber welt 4 (which is further illustrated in FIGS. 10 and 12) adapted to fit into the recessed region formed between the insole base 8 and the insole filler 9. The welt 4 may be made a part of the vulcanizate construction or may be separately affixed to a vulcanizate comprised of the uncured rubber upper 3, insole 7 and midsole 5. Materials constructed of plastic material including thermoplastics, rubber and other natural or synthetic construction may be used as a welt and separately affixed (e.g. adhesive, sewing, etc.) to such a vulcanizate. The uncured welt 4 is advantageously of a T-shape or a three-edged construction. The horizontal base may be suitably designed for positioning into the recessed portion of the insole while the verticle extending ridge thereto may be designed so as to interface with the rubber upper 3 as shown in FIG. 4. The internally disposed surfaces of the welt 4 are preferably tapered so as to permit the formation of a smooth contoured vulcanizate surface with the midsole 5 and upper 3. Typically, rubber footwear vulcanizates do not incorporate a rubber welt into their construction. The outer edge of welt 4 may be suitably adapted and designed so as to coincide with the outer periphery of the midsole as shown in FIG. 12. FIG. 5 illustrates a bottom view of the midsole vulcanizate 5 while FIG. 6 illustrates a cross-sectional view thereof taken along line 6—6. As shown in FIG. 6, both the bottom and top surfaces of the midsole contain a plurality of macroscopic projections which randomly extend outwardly from the midsole 5 surface. FIG. 7 depicts a bottom view of an outer sole 6 which may be separately secured to the midsole 5.

Figure 9:
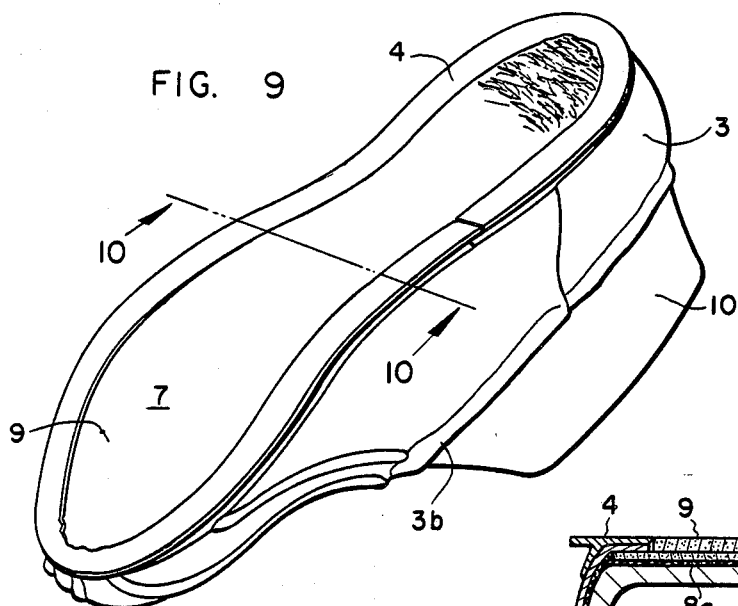
FIG. 9 shows a perspective bottom view of an uncured rubber welt assembled onto the footwear assemblage of FIG. 8.
Figure 10:
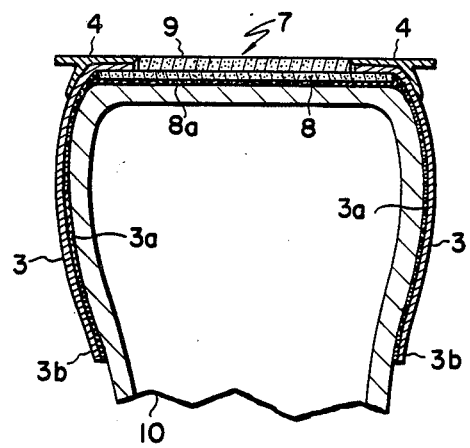
FIG. 10 is a cross-sectional view taken along line 10—10 of FIG. 9 and reveals a cross-sectional cut of the uncured upper, insole and welt upon a metal last.
Figure 11:
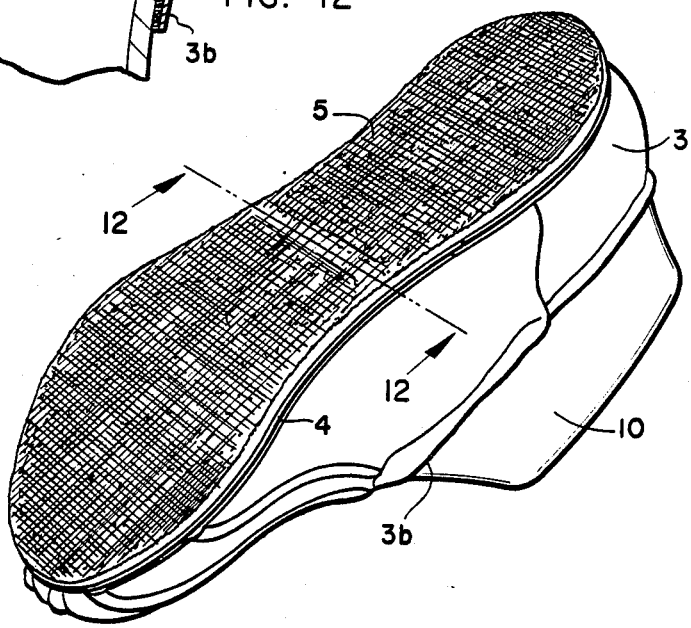
FIG. 11 is a perspective bottom view of the uncured assembly with the midsole attached thereto.

The manufacture may be suitably achieved, as may be seen by reference to FIGS. 8-12, by adhesively overlapping an uncured rubber upper portion 3 onto the recessed area formed between the insole base 8 and filler 9 of the uncured rubber insole 7 upon a forming last 10 as illustrated in FIG. 8; the uncured rubber welt 4 may then adhesively overlap onto the uncured rubber upper portion 3 and said uncured rubber insole 7 (within the recessed area formed by the projecting filler 9 and insole base 8 about the outer periphery of the shoe bottom) as illustrated by FIGS. 9 and 10; and thereafter adhesively affixing a rubber vulcanizate midsole article 5 onto the rubber welt 4 and the insole base 8 to provide an uncured assembly as shown in FIGS. 11 and 12. The uncured assembly may then be vulcanized to provide an intermediate vulcanizate footwear assembly which is generally designated as 2 in FIG. 1. The rubber upper 3 employed in the footwear assembly illustrated by the cross-sectional views of FIGS. 10 and 12 is comprised of liner 3a and an uncured rubber outer portion 3b. Liner 3a serves to provide a more comfortable footwear product but may, if desired, be omitted.

The interfacing components of the vulcanizate assembly may be appropriately constructed of a wide variety of natural and synthetic rubbers. Illustrative synthetic rubbers include the polymerizates of diethylenically unsaturated monomers alone or in combination with other conventional ethylenically unsaturated comonomers. Included amongst such ethylenically unsaturated monomers are the straigth and/or branched chain diolefines such as isoprene, butadiene, chloroprene, diethylbutadiene, mixtures thereof and the like. The conjugated dienes are preferred. Copolymerized diethylenically unsaturated cyclic hydrocarbons such as the bicyclo-heptadienes etc. the substituted cyclic hydrocarbon dienes (e.g. halogenated etc.) and the like may also serve as a diethylenic unsaturated monomer or comonomer source. Other conventional ethylenically unsaturated comonomers may be suitably copolymerized with the diethylenically unsaturated comonomers (especially with the conjugated dienes) to impart certain desirable attributes to the synthetic rubber. Included amongst such comonomers are the lower alkenes (e.g. $C_1$-$C_4$ olefins such as ethylene, propylene, isobutylene, etc.), styrene and styrene derivatives, acrylonitrile, acethylene, and other comonomers conventionally copolymerized with dienes in the manufacture of synthetic rubbers. Illustrative of such synthetic rubbers are butyl rubber (isobutylene/isoprene copolymerizate), cis-polyisoprene, neoprene (e.g. neoprene/acetylene copolymerizates), Buna N (e.g. butadiene/acrylonitrite copolymerizates), ethylene and/or propoylene/neoprene and/or butadiene/bicycloheptadiene copolymerizates, etc., mixtures thereof and the like.

Pursuant to the present invention, the midsole article 5, as depicted in FIGS. 5 and 6, is especially adapted to permit its intervulcanization with the other uncured rubber footwear components and affords a supportive base for separately securing the outer sole 6 thereto. The invention departs from conventional rubber footwear manufacture not only by the nature and character of the midsole 5 but also by its use in the construction of a rubber vulcanizate. The dimensional size and shape of the midsole base 5 is advantageously designed so as to provide a supportive base for said outsole 6. The midsole 5 can be incorporated into the vulcanizate so that it extends outwardly beyond the base of the rubber upper as illustrated in FIGS. 1, 11 and 12. Heretofore, such a midsole construction and appearance were commonly incorporated into leather footwear products but were inapposite to the rubber vulcanizate manufacture. The outer edge of the midsole 5 may be suitably cut so as to substantially coincide with the outer edge of the assembled welt. The midsole base 5 should be constructed of a material capable of withstanding the relatively high temperatures needed to vulcanize the uncured rubber assembly (illustrated in FIGS. 11 and 12) into a vulcanizate assembly 2 (as designated in FIG. 1) of a unitary construction.

The midsole base construction and chemical composition must necessarily withstand the vulcanization conditions needed to cure the uncured rubber components into a vulcanizate without causing any appreciable deformation to the dimensional size, shape, function or construction (e.g. melting, shrinkage and other physical or chemical decomposition or deterioration) of the midsole base article. Certain polymeric substances such as thermoplastics which melt, deform or fail to retain their structural integrity under vulcanization conditions are unsuitable midsole base materials. Thermoplastic possessing sufficiently high resistance against melting and deterioration at or above the vulcanization temperatures such as certain high molecular weight, thermoplastic materials (e.g. the thermoplastic rubbers, etc.) or those formulated with certain melt retarding additives or comonomers to prevent or inhibit its thermal deformation or decomposition may be adapted for use as a midsole base article.

Crosslinked polymeric materials, thermally resistant against deformation and decomposition when subjected to vulcanization and which may be coated with an uncured rubber (at the midsole base surface interfacing with the other uncured rubber components of the assemblage) and permit the midsole 5 to be intervulcanized therewith into a vulcanizate of a unitary construction have found to be useful as a midsole base article. Rubber vulcanizates, including those formulated with fillers, are especially well adapted for use as a midsole base article. Filler rubber vulcanizates may be prepared by uniformly admixing together (e.g. in a Branbury mixer) an uncured rubber and filler or precursors thereof along with the other desired conventional vulcanization additives and forming the admixture (e.g. via calendering, extruding, molding, etc.) under vulcanizing conditions into a vulcanizate composite of the desired midsole thickness. The preformed vulcanizate may be milled, cut or stamped into the desired size and configuration of the midsole component. The vulcanizate composite may contain a particulated filler embedded and uniformly distributed throughout the vulcanizate structure. Fibrous materials or fibrous precursors derived from a variety of sources may be used as a filler incorporated into the vulcanizate midsole base artice. Natural, synthetic and fibrous particulated substrates (organic or inorganic) may be utilized as fibrous fillers or precursors. Animal or proteinaceous fibrous substances (e.g. leather dust, silk, hair, wool), egetable or cellulosic materials (e.g. cotton, flax, hemp, jute, grain fibers or pulp such as wheat, oat, bran, corn, soybean, cottonseed, etc.), fibers or pulp of wood etc.; regenerated fibrous materials (e.g. cellulose, proteinaceous, etc.) synthetic fibers such as cellulose acetate, the acrylic fibers (e.g. polyarylonitrile etc.), and vinyl choloride/acrylonitrile copolymerizates etc., inorganic or mineral substances (e.g. asbestos, etc.) mixtures thereof and the like are exemplary of such fibrous source materials. Cellulosic pulps such as those obtained from vegative pulpy substances are a particular suitable fibrous source material. Wood fibers (e.g. wood flour, sawdust, buffer dust, etc.) are especially well suited as a filler.

The midsole vulcanizate base 5 should be treated on at least one major surface and preferably on both major sufaces. The midsole surface interfacing with the internally disposed portions of the vulcnizate assembly should be chemically and/or mechanically treated so as to permit the application and adherence thereto of an uncured rubber coating thereupon. Chemical treatments which permit an uncured rubber coating to wet and adhere to midsole 5 such as the chlorinating acids may be used for this purpose. Similarly, roughing or abrading of the midsole provides a suitable surface for coating the midsole surface with an uncured rubber. As illustrated in FIG. 6, such roughening tends to create a multiplicity of macroscopic projections or appendages which are firmly anchored within the vulcanizate matrix and such a pretreated surface permits the impregnating and coating of the midsole inner surface with an uncured rubber substrate. Thus, the coated inner midsole surface may thereby be intervulcanized with the other uncured assembly components into a rubber vulcanizate of unitary construction. A similarly treated outer midsole surface (e.g. roughened or abraded) affords the means whereby an outer sole may be separately affixed to the vulcanizate assembly. Abrading with a wire brush, a coarse emery wheel or coarse sandpaper (e.g. 60-80 grit) lengthwise and crosswise may be used effectively as a pretreatment for both of these surfaces. A milled rubber composite (manufactured and distributed by Monarch Rubber Co., Baltimore, Md.) commercially available and known as 1541 Apollo milled to a thickness ranging from about 2 to about 4 mm (preferably about 3 mm) and abrasively surface brunished (lengthwise and crosswise) has been found particularly effective as a rubber vulcanizate base article 5.

The midsole base article cannot, by itself, be intervulcanized with other component parts of the assembly. Coating the internal surface of the midsole (i.e. surface portion interfacing the welt, and insole) with an uncured rubber coating will typically impart sufficient adhesive tack to permit adhesive bonding of the midsole article to the uncured rubber footwear assembly as depicted in FIGS. 11 and 12 while compositionally providing a substrate which will intervulcanize with the other uncured footwear components to provide a vulcanizate product of unitary construction. Although the uncured coating thickness may vary, a coating of less than about 25 Mil. (i.e. 25/1000 inch) thickness and most typically less than 15 Mil. (e.g. about 5 to about 10 Mil.) will generally be sufficient to permit the midsole to be intervulcanized with the interfacing assemblage componets.

The creation of a satisfactory uncured rubber coating upon the midsole base article 5 may be most effectively achieved by a two stage coating process. The first stage may be suitably effectuated by initially coating the midsole vulcanizate base with an uncured rubber latex followed by a second coat or overcoat of an uncured rubber solution. Such a two stage coating process tends to significantly improve the wetting penetration and tenacity of the uncured rubber to the midsole vulcanizate base article and the ultimate structural integrity of the vulcanizate bond.

The uncured rubber latex may typically be comprised of an uncured natural or synthetic rubber uniformly dispersed, throughout a polar dispersant such as water. Such latexes are typically formulated with conventional emulsifiers or surfactant systems (natural or syntehtic) to emulsify finely divided or minute uncured rubber particles throughut an aqueous carrier along with, wetting agents, crosslinking agents (e.g. sulfur), tackifiers and other conventional curable rubber latex additives. Conventional lower alkyl alcohols (e.g. ethanol, propanol, etc.) are frequently added to enhance the wetting and penetration of the uncured rubber molecules and curing reagents into the porous intercies of the midsole base 5. A commercially available natural rubber latexes sold, as "Northwest Latex 3003 (neutral)", manufactured and distributed by Northwest Coating Co., Oak Creek, Wis. has been found to be particularly effective as a latex coating substrate. Conventional coating techniques (e.g. spraying, brushing, dipping, etc.) may be used to uniformly apply the latex to the inner midsole surface. The volatile carrier or constituent (namely water) may then be removed by conventional drying techniques (e.g. air, oven, vacuum drying, etc.) conducted below the uncured rubber vulcanization temperature. The dry latex coating will form an uncured rubber film upon the midsole inner surface.

An uncured rubber solution may then be applied onto the dry latex coating. Such uncured rubber solutions typically include a suitable rubber solvent or non-polar dispersant, an uncured rubber solute uniformly dispersed therein plus crosslinking reagents, accelerators, wetting agents and other conventional curative additives therefore. Solvents such as gasoline, benzene, chloroform, carbon tetrachloride, carbon disulfide tend to swell uncured and cured rubbers. These solvents may be effectively utilized to enhance the penetration of the uncured rubber solution and vulcanizate reageants into dry latex coating of the midsole vulcanizate base 5 and to provide a more uniform coating of the uncured rubber molecules upon the vulcanizate surface of the midsole 5. An illustrative uncured rubber solution (preferably of a high bond strength and excellent relaxation properties) may be conveniently prepared by uniformly admixing together, in a cement churn, an uncured rubber stock, isoprophyl alcohol as a wetting agent, sulfur, hexane and heptane as cosolvents and such other conventional rubber curative additives (e.g. accelerators, activators, anti-oxidants, tackifier, etc.) in conventional concentrations. The uncured rubber solution may then be applied to the dry latex precoat by conventional techniques such as those mentioned hereinbefore in applying the latex coating. After the uncured rubber solution has been applied, excess solvent may be removed therefrom by conventional means such as vacuum, air or oven drying, etc.

The uniformly coated vulcanizate midsole base 5 precoated with a dry latex and a solvent overcoat of curable rubber compositions provides an uncured rubber base which readily intervulcanizes with the other uncured assembly of component parts into a vulcanizate assembly of a unitary construction. The dual, precoated vulcanizate midsole base 5 thus described may be used to prepare the uncured footwear assemblage illustrated in FIGS. 11 and 12. Characteristic of uncured rubber stock, the uncured coating lamina permits its adhesive affixation to the adjacently positioned uncured welt 4 and filler 9 of the insole 7 upon the last 10. The uncured assemblage as illustrated in FIGS. 11 and 12 may then be vulcanized. The vulcanization effectuates a melding together of uncured rubber components including the uncured rubber coated components into a vulcanizate assembly of unitary construction. The lamina between the component parts are chemically altered into a unitary vulcanizate product. Coating of the outwardly projecting midsole 5 surface is generally inadvisable unless it is desired to separately apply a rubber outsole (e.g. specialty soles such as a golf, running etc.) thereto in which case the uncured rubber coating therefore would be applied after the vulcanizate assembly had been made.

The vulcanizate assembly 2 of this invention differs from conventional rubber vulcanizate footwear by the inclusiveness within its construction of the midsole 5. The midsole 5 as illustrated in FIGS. 1, 11 and 12 bears a relationship closely to those typically found useful in the rubber footwear industry. Unlike the flexible and internally disposed binders or fillers often used by the rubber vulcanizate as an internal interfacing component part to the outsole. A portion of the midsole 5 can be designed as an externally exposed component of the assembled footwear product.

In the preferred embodiments of the invention, the midsole 5 provides an interfacing surface substantially commensurate in size, shape and surface area as the separately secured outsole 6. The outer surface midsole 5 contour may be suitably matched to the inner interfacing surface of the outsole 6 to provide a firm base thereto. Preferably, the outer surface of the midsole 5 will be substantially flat and cut so as to correspondingly match the outer dimension or periphery of the outsole 6.

The present invention permits the vulcanizate assembly to be combined with a multiplicty of outer sole types. An intermediate vulcanizate article, without an outer sole may be intially manufactured, and a more fashionable or speciality outer sole may then be separately secured thereto. The unique constructions and method of manufacture enables the rubber footwear vulcanizate industry to produce a vulcanizate footwear product fitted with divergent soles. Substantial inventory and shipping cost savings may be realized by the ability to provide a vulcanizate footwear assembly adapted to separately receive an outer sole. The vulcanizate assembly may be conveniently shipped from the manufacturing site to a plurality of distant distributing sites at which the desired outer sole may be secured thereto. The outer midsole surface may be treated with the latex precoat and uncured rubber solution overcoat as the inner midsole surface described hereinbefore to permit the subsequent affixing thereto of uncured outer sole via vulcanization thereto. Alternatively, an outer sole vulcanizate of a similar composition and construction as the midsole base article may be coated with an uncured rubber as defined herein and intervulcanized therewith to provide the desired completed footwear product. The vulcanizate base footwear assembly 2 may also be adapted to subsequent securance of the outer sole by injection molding techniques wherein a molten mass of an uncured rubber base, thermoset plastic or thermoplastic material may be injected into a forming mold (bearing the desired outer sole configuration) onto the vulcanizate base footwear assembly and cooled to provide an outer sole securely affixed thereto. A multitude of outer soles differing in color, design and functional utility may accordingly be firmly secured to the vulcanizate footwear assembly provided herein. Unlike conventional rubber footwear product manufacture, the present invention obviates the need of manufacturing the completed footwear product in a single vulcanizate step.

Another important attribute of the present invention resides upon the ability to adhesively apply an outsole to the vulcanizate base footwear product. A multiplicity of compositionally different outer soles can be adhesively secured to the midsole of the vulcanizate assembly. The pretreated outer surface of the midsole as mentioned hereinbefore affords a secure base for applying an adhesive composition to the midsole surface and for firmly affixing or anchoring the outer sole to the vulcanizate assembly. In contrast to conventional rubber footwear vulcanizates which are normally discarded when the outer sole becomes worn and unfit for further use, the present footwear products are repairable simply by replacing the worn outer sole with a new outer sole replacement.

Another important attribute of the present invention is afforded by the ability to provide a vulcanizate footwear assembly 2 comprised of a cured rubber upper, rubber insole, rubber welt and midsole of a unitary construction in combination with a compositionally different outer sole securely affixed thereto. The rubber footwear industry may now manufacture uniquely different rubber footwear products incorporating the most desirable attributes of footwear vulcanization. Rubber footwear products of a lighter weight, embodying significant advances in style, design and utility are now made possible by the embodiments of this invention.

Outsoles constructed of a host of natural and/or synthetic materials are adaptable to the present footwear products. In general, the vulcanizate footwear base article may be adapted to a wide variety of soles presently used in the construction of other footwear products many of which were unfit for use in conjunction with rubber vulcanizate footwear products. Exemplary outer soles include naturally occuring materials such as natural rubber crepe soles, leather soles, etc. as well as soles of a synthetic thermoplastic or thermoset construction such as polyurethane, ethyl vinyl acetate, polyolefins, polyvinylchloride, foamed thermoset and/or thermoplastic soles (e.g. macroscopic and microcellular) of an open or closed cellular construction, combinations thereof and the like. The present invention affords a means for substantially reducing the overall footwear weight by not necessarily being limited to a rubber vulcanizate (specific gravity normally within 1.2–1.3 range depending upon additives) outsole. Outsoles of a specific gravity signifcantly less than a cured rubber (0.8) including those of a specific gravity less than about 0.6 or less as well as those outsoles of foamed construction of a specific gravity less than about 0.5 (often less than about 0.4) may be separately affixed to the vulcanizate assembly.

The most appropriate adhesive for securing the outsole to the midsole will depend upon the composition and adhesive compatability of the interfacing surface of the desire outsole with the adhesive. The midsole composition and construction is generally compatible with a broad range of those adhesives commonly used in securing outsoles in the shoe manufacture and repair trade.

Exemplary adhesives include the thermoplastic hot melts, contact cements, polyurethane cements, epoxides, animal glues, rubber cements (e.g. the neoprene cements), mixtures thereof and the like. The neoprene and polyurethane cements have been found particularly effective adhesives for rigidly and permanently securing outsoles to the midsole.

What is claimed is:

1. A method for manufacturing a rubber footwear product comprised of: (a) a vulcanizate assembly comprising a rubber upper portion, a rubber insole and a midsole article; and (b) an outsole separately secured onto said midsole article of said vulcanizate assembly, said method of manufacture comprising:
   A. lasting an uncured rubber upper portion onto an uncured rubber insole,
   B. affixing a midsole article onto the uncured rubber insole with said midsole article comprising:
      (a) a midsole base of a cross-linked polymeric material having a dimensional size sufficient to provide a supportive base for said outsole, and
      (b) an uncured rubber coating upon the inner surface of said midsole article with said uncured rubber coating being characterized as having sufficient adhesive tack to affix said midsole article onto said uncured rubber insole,
   C. vulcanizing said uncured rubber upper, said uncured rubber insole and said uncured coating of said midsole article to provide a vulcanizate assembly of a unitary vulcanizate construction, and
   D. separately securing an outsole to said vulcanizate assembly;

and thereby providing a rubber footwear product comprised of a rubber vulcanizate assembly and an outsole separately secured onto the midsole article of said vulcanizate assembly.

2. The method according to claim 1 wherein the midsole base comprises a rubber vulcanizate.

3. The method according to claim 2 wherein the midsole coating comprises an uncured rubber latex.

4. The method according to claim 2 wherein the outer sole is separately affixed to the midsole by an adhesive composition.

5. The method according to claim 4 wherein the specific gravity of the outer sole is substantially less than the specific gravity of the rubber vulcanizate.

6. The method according to claim 1 wherein the coating for said midsole base article comprises an uncured rubber latex precoat and an uncured rubber solution overcoat.

7. The method according to claim 1 wherein an uncured rubber welt is adhesively affixed onto the lasted uncured rubber upper and uncured rubber insole prior to the adhesively bonding of the midsole article thereto.

8. The method according to claim 7 wherein the midsole article is affixed onto said uncured insole and said uncured rubber welt.

* * * * *